United States Patent [19]

Klug

[11] Patent Number: 4,502,344
[45] Date of Patent: Mar. 5, 1985

[54] SELF-ENERGIZING FRICTION DRIVE TRANSMISSION

[75] Inventor: Alan G. Klug, Oshkosh, Wis.

[73] Assignee: Ingersoll Equipment Co., Inc., Winnecone, Wis.

[21] Appl. No.: 386,121

[22] Filed: Jun. 7, 1982

[51] Int. Cl.$^3$ .............................................. F16H 15/08
[52] U.S. Cl. ....................................... 74/194; 74/196; 74/197
[58] Field of Search ................... 74/194, 196, 197, 105

[56] References Cited

U.S. PATENT DOCUMENTS

| | | | |
|---|---|---|---|
| 2,317,418 | 4/1943 | Svoboda | 74/194 |
| 2,942,487 | 6/1960 | Claus | 74/197 |
| 3,327,546 | 6/1967 | Gordon et al. | 74/194 |
| 3,580,351 | 5/1971 | Moller | 74/194 |
| 3,667,304 | 6/1972 | Puffer et al. | 74/196 |
| 3,678,770 | 7/1972 | Enters et al. | 74/197 |
| 3,720,112 | 3/1973 | Enters et al. | 74/196 |
| 3,813,954 | 6/1974 | Price et al. | 74/194 |
| 3,986,414 | 10/1976 | Peterson et al. | 74/194 |
| 4,036,458 | 7/1977 | Matthey et al. | 74/194 |
| 4,169,392 | 10/1979 | McDonald | 74/194 |
| 4,173,153 | 11/1979 | Klug et al. | 74/194 |
| 4,270,400 | 6/1981 | Fodor | 74/194 |

Primary Examiner—Lawrence J. Staab
Assistant Examiner—Michael David Bednarek
Attorney, Agent, or Firm—Cullen, Sloman, Cantor, Grauer, Scott & Rutherford

[57] ABSTRACT

A friction disc transmission including a conventional drive disc rotatable about a vertical axis and a vertical friction disc engaging the top horizontal face of the drive disc to be driven about a horizontal axis. The driven friction disc is rotatably supported between a fixed frame member and a floating plate member. The floating plate member is lifted or lowered by a bellcrank having a pin that is movable within a slot in the floating plate member. A clutch pedal is connected to the bellcrank for pivoting the bellcrank thereby raising and lowering the floating plate member and driven disc. The bellcrank pin is biased by a spring which is connected to the bellcrank to apply a downward normal force on the floating plate member and driven disc. Guide pins are provided on the floating plate member which are engageable with guide brackets to limit the vertical movement of the floating plate member. The friction disc transmission is placed into a forward or reverse drive condition by partially releasing the clutch pedal to permit initial engagement and slippage between the discs. When the clutch pedal is completely released, the bellcrank spring rotates the bellcrank for biasing the bellcrank pin against the lower edge of the floating plate slot thereby providing an additional normal force between the driven and drive discs.

1 Claim, 5 Drawing Figures

SELF-ENERGIZING FRICTION DRIVE TRANSMISSION

BACKGROUND OF THE INVENTION

The present invention relates to a variable speed friction disc transmission having a pair of discs with a friction or driven disc having its periphery engaging the face of a drive disc. Friction disc transmissions of the type disclosed herein are used primarily of propulsion of small land traversing machines, particularly power lawn mowers.

A variable speed friction disc transmission of the type disclosed herein is shown in U.S. Pat. Nos. 4,169,392 and 4,173,153, assigned to the assignee of the present invention. The transmission disclosed in the aforementioned patents includes a driving disc rotatable about a vertical axis having a flat horizontal force normal to its axis of rotation and a driven disc rotatable on an axis normal to the axis of the driving disc and having its periphery engaging the face of the driving disc. The driving disc is rotatably supported on a swing arm which is swingable about a vertical axis.

The speed at which rotation is imparted to the driven disc is a function of the distance between the axis of the driving disc and the zone at which its face is engaged by the periphery of the driven disc. Further, the driven disc rotates in one direction on one side of the rotational axis of the driving disc and in the opposite direction on the opposed side.

The friction disc transmission disclosed in U.S. Pat. Nos. 4,169,392 and 4,173,153 has the disadvantage of causing rapid acceleration starts when the driven disc contacts the driving disc upon release of the clutch pedal. The rapid acceleration results because of a self-energizing feature that exists in the construction which causes the contact pressure between the driven and driving discs to be proportional to the torsional load on the wheel axle. The initial engagement between the driven and driving discs produces slippage which is sensed and abruptly corrected resulting in rapid acceleration.

Thus, there has been a need for a friction disc transmission which provides a smooth start when the friction discs are initially engaged while being self-energizing to overcome slippage under load.

SUMMARY OF THE INVENTION

The self-energizing friction disc transmission of the present invention includes a drive disc rotatably mounted on a generally vertical axis and a driven friction disc rotatable about an axis normal to the axis of the drive disc and having a periphery engaging the face of the drive disc. The friction disc transmission provides a smooth start when the friction discs are initially engaged while being self-energizing to overcome slippage under load. This is accomplished by allowing some slippage between the discs initially and then adding a spring force between the discs to overcome slippage under load.

The driven friction disc is rotatably supported on a drive shaft between a fixed frame member and a floating plate member. When the floating plate member moves downwardly the friction disc drive shaft pivots downwardly at that end and the driven friction disc is brought into engagement with the drive disc. Alternatively, when the floating plate member moves upwardly, the friction disc drive shaft moves upwardly and the friction driven disc is disengaged from the drive disc.

The floating plate member is lifted and lowered by means of a bellcrank. The bellcrank is pivotally attached to a a frame side wall and includes a pin that is movable within a slot in the floating plate member. A clutch pedal is connected to the bellcrank for pivoting the bellcrank thereby raising and lowering the floating plate member and driven disc. The bellcrank pin is biased by a spring which is connected to the bellcrank to apply a downward normal force on the floating plate member and driven disc.

The floating plate member further includes guide pins which are engageable with guide brackets to limit the vertical movement of the floating plate member.

When the clutch pedal is depressed such that the clutch pedal force on the bellcrank exceeds the force of the bellcrank spring, the bellcrank rotates such that the bellcrank pin engages the top edge of the floating plate slot thereby raising the floating plate member until its guide pins engage the horizontal edges of the guide brackets. In this position, the friction driven disc is lifted or raised above the drive disc and the friction disc transmission is in neutral.

The friction disc transmission is placed into a forward or reverse drive condition by partially releasing the clutch pedal which allows the bellcrank spring to rotate the bellcrank until the bellcrank pin reaches an intermediate position within the floating plate slot. This permits initial engagement and slippage between the discs and some rotation of the floating plate member. The floating plate member is rotated in opposite directions, depending upon the direction of rotation of the friction driven disc. As the floating plate member rotates, one of its guide pins rotates and moves into engagement against the corner formed by the vertical and horizontal edges of one of the guide brackets.

During the initial slippage engagement between the discs, the vertical force from the guide bracket against the floating plate guide pin is balanced by the vertical force between the discs which permits horizontal frictional forces between the discs for the self-energizing effect and for a smooth start. Thus, when the clutch pedal is partially released which places the bellcrank pin at an intermediate position within the floating plate slot, slippage occurs between the discs as they initially contact, thereby providing smooth acceleration from stop to a travel speed.

When the clutch pedal is completely released removing the clutch pedal force on the bellcrank, the bellcrank spring rotates the bellcrank for biasing the bellcrank pin against the lower edge of the floating plate slot thereby providing an additional normal force between the driven and drive discs. This additional spring or normal force from the driven disc to the drive disc overcomes slippage between the discs for accommodating high traction load requirements.

Thus, the self-energizing friction disc transmission of the present invention provides a smooth start by permitting some slippage between the discs when they are initially engaged while adding a spring or normal force between the discs to overcome slippage under load.

Other advantages and meritorious features of the present invention will be more fully understood from the following description of the preferred embodiment, the appended claims and the drawings, a brief description of which follows.

DETAILED DESCRIPTION OF THE INVENTION

Figure 1:
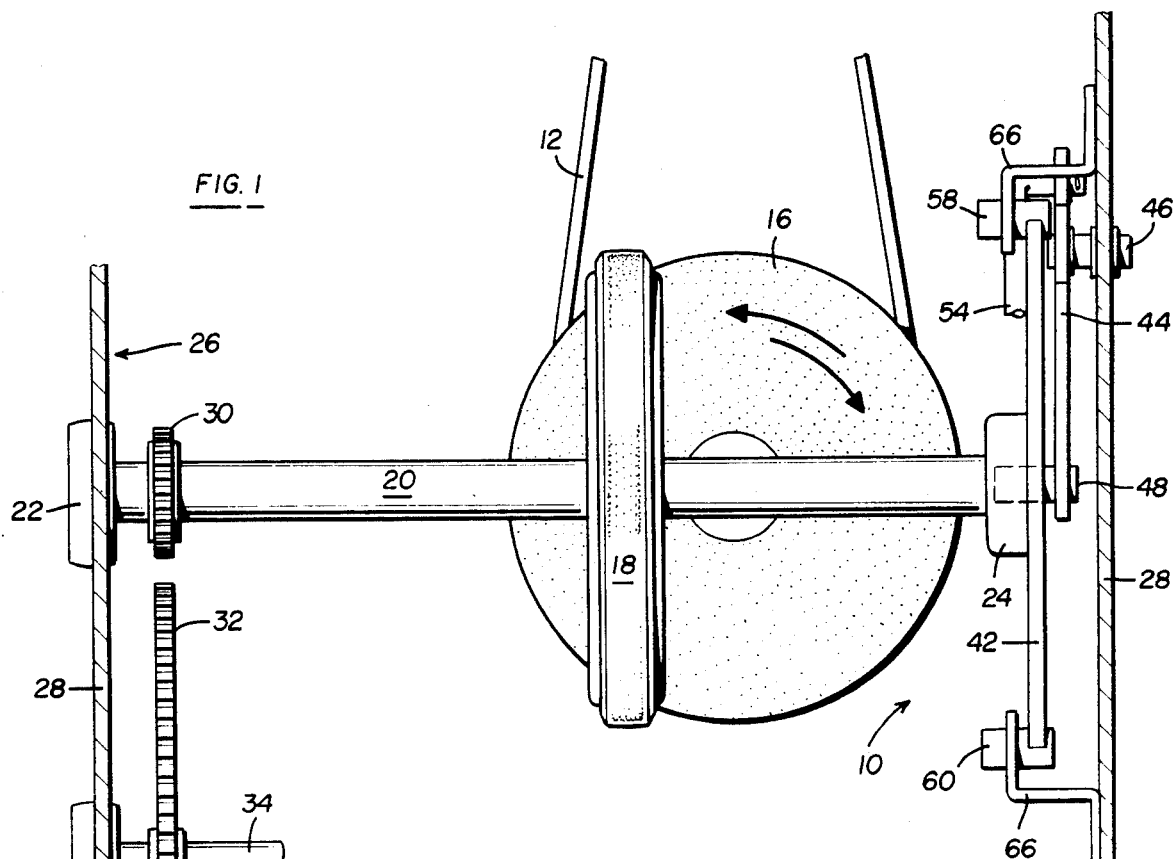
FIG. 1 is a top plan view of the friction disc transmission of the present invention.
Figure 2:
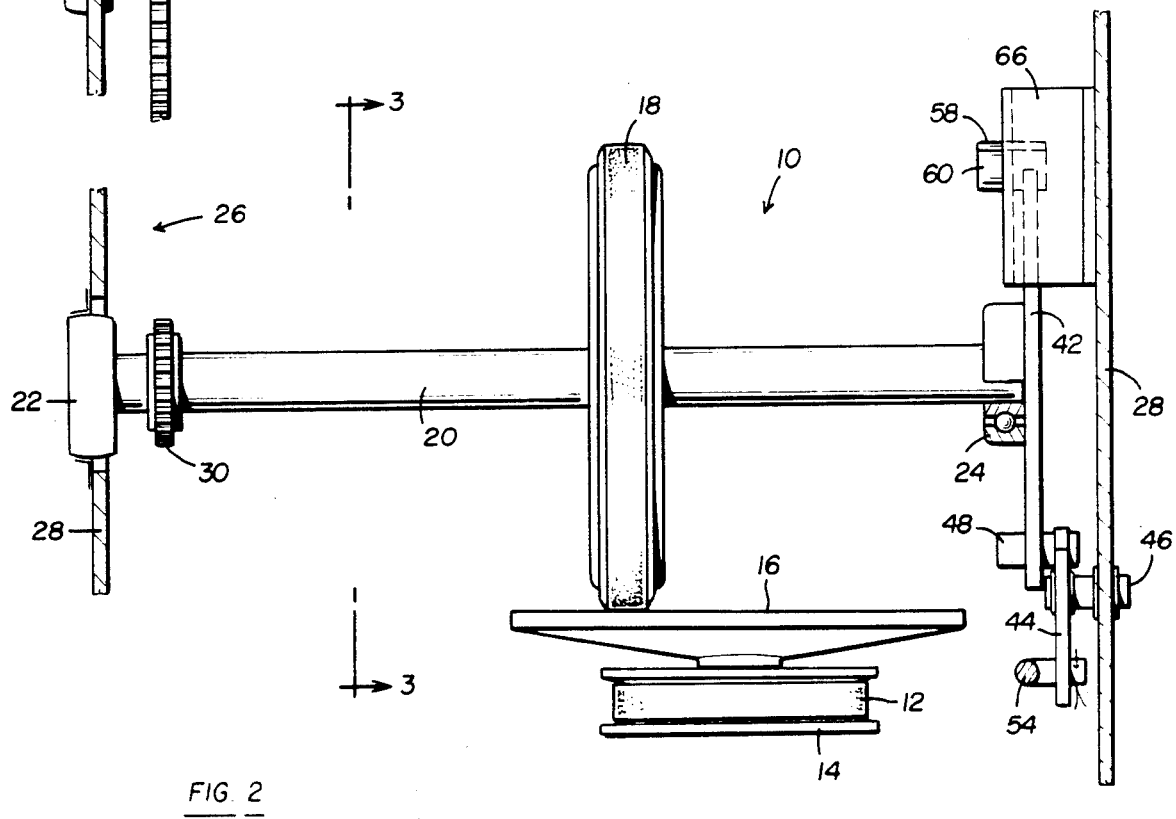
FIG. 2 is an end view of the friction disc transmission shown in FIG. 1.

A self-energizing friction disc transmission 10 made in accordance with the teachings of the present invention is illustrated in FIGS. 1-5. The friction disc transmission of the present invention is designed for use in small tractor-like machines such as power lawn mowers, but it will be understood by those skilled in the art that the self-energizing transmission of the present invention may be utilized in other applications.

The power source for the friction disc transmission 10 may be a conventional gasoline motor (not shown) having a drive shaft extending vertically downwardly with a drive pully secured to the shaft for rotation therewith. A conventional V-belt 12 connects the motor drive pully (not shown) to the drive pully 14 for the friction disc transmission 10. Pulley 14 is rotatably connected to drive disc 16 and the motor (not shown) rotatably drives the drive disc 16 about a vertical axis through V-belt 12 and pulley 14.

The driven assembly includes the friction or driven disc 18 which is rotatably supported on an axis comprising shaft 20 and bearings 22 and 24. The bearing end 24 of shaft 20 is pivotally movable downwardly relative to shaft bearing end 22 to permit engagement between friction disc 18 and drive disc 16, as will be described. Shaft 20 is supported for rotation between a frame 26 comprising side plates 28. The side plates 28 of frame 26 are fixed and supported in a conventional manner within the tractor frame (now shown).

Drive disc 16 is supported on a swing arm (not shown) which is swingable to different positions to permit engagement with driven disc 18 on opposite sides of the vertical rotational axis for disc 16. Friction disc 18 is brought into engagement with drive disc 16 on one side of the vertical rotational axis of drive disc 16 for rotating friction disc 18 in one direction and on the opposed side of the vertical axis for rotating friction disc 18 in the opposite direction. Further, the speed of rotation imparted to friction disc 18 is dependent upon the distance between the vertical axis of drive disc 16 and the zone at which its face is engaged by the periphery of friction disc 18.

A hub sprocket 30 is supported on shaft 20 for rotation with friction disc 18. A drive chain (not shown) connects hub sprocket 30 to sprocket 32 for driving the larger sprocket. Sprocket 32 is rotatably supported on a second shaft 34 which is secured to side wall 28 by bearing element 36. Power is tranmitted from sprocket 32 to drive the tractor wheels forward or in reverse depending upon the position of friction disc 18 relative to drive disc 16.

The friction disc transmission of the present invention provides a smooth start when the discs 16 and 18 are initially engaged while being self-energizing to overcome slippage under load. This is accomplished by a clutch assembly 40 which allows some slippage between discs 16 and 18 when they are initially engaged and adds a normal force between discs 16 and 18 to overcome slippage under load.

Clutch assembly 40 includes a floating plate member 42 which supports bearing 24 and one end of shaft 20. The other end of shaft 20 is supported within a spherical bearing 22 which permits pivotal movement of shaft 20 at bearing end 24 in response to vertical movement of floating plate member 42. When floating plate member 42 moves downwardly, shaft 20 pivots downwardly at bearing end 24 and friction disc 18 is brought into engagement with drive disc 16. Alternatively, when floating plate member 42 moves upwardly, shaft 20 pivots upwardly at bearing end 24 and friction disc 18 is disengaged from drive disc 16.

Floating plate member 42 is lifted and lowered by means of a bellcrank 44. Bellcrank 44 is pivotally attached to side wall 28 by pivot shaft 46 and includes a pin 48 that is movable within a slot 50 in floating plate member 42. A clutch pedal 52 is connected by link 54 to bellcrank 44 for pivoting bellcrank 44 on pivot shaft 46 thereby raising and lowering floating plate member 42 and friction disc 18. Pin 48 is biased to apply a downward normal force on floating plate member 42 and friction disc 18 by a spring 56 which is connected to bellcrank 44.

Floating plate member 42 further includes guide pins 58 and 60 which are engageable with the vertical and horizontal edges 62 and 64 of guide brackets 66 to limit the vertical movement of member 42. Guide brackets 66 are attached to one of the side walls 28.

Figure 4:
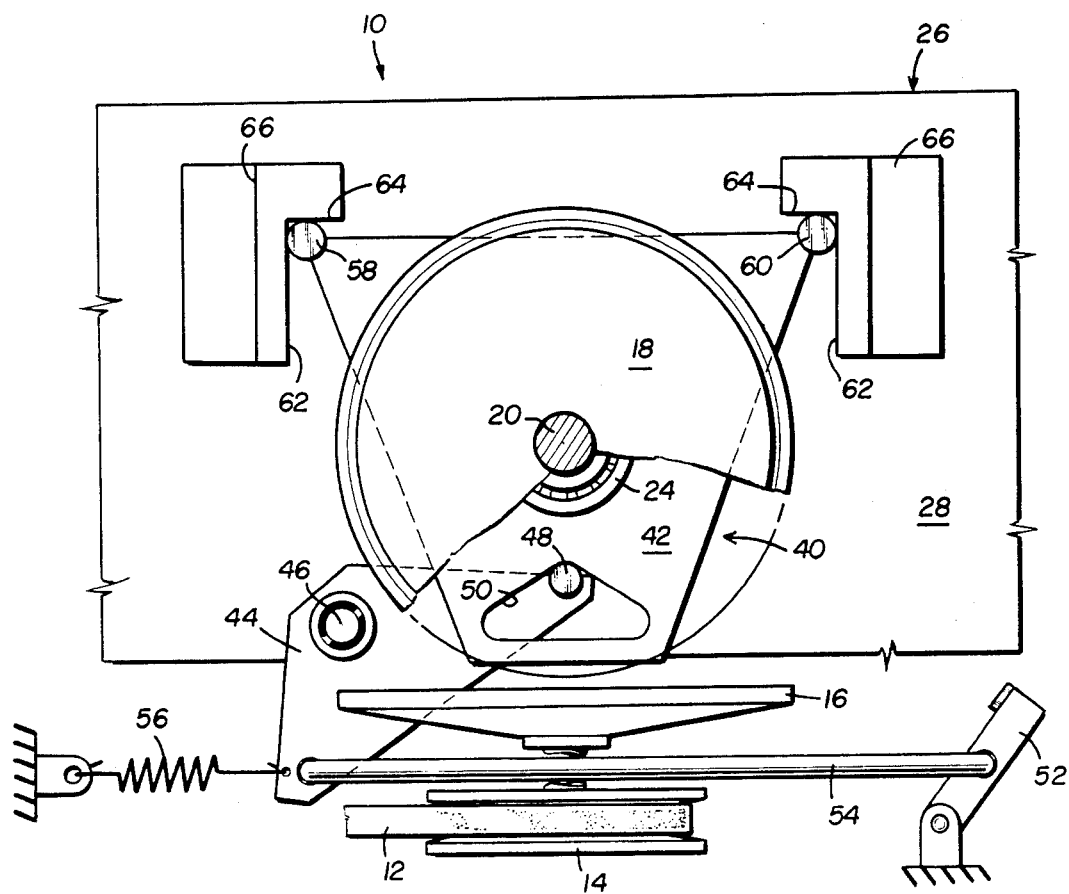
FIG. 4 is a view similar to FIG. 3 but illustrating the friction drive transmission in a neutral condition.

The operation of the friction disc transmission 10 will now be described by referring to FIGS. 3-5. Referring to FIG. 4, when clutch pedal 42 is depressed such that the clutch pedal force on bellcrank 44 exceeds the force of spring 56, bellcrank 44 rotates counterclockwise such that pin 48 engages the top edge of slot 50 thereby raising floating plate member 42 until pins 58 and 60 engage the horizontal edges 64 of guide brackets 66. In this position, friction disc 18 is lifted or raised above drive disc 16 and the friction disc transmission is in neutral.

The friction disc transmission 10 is placed into a forward or reverse drive condition by partially releasing clutch pedal 52 which allows spring 56 to rotate bellcrank 44 clockwise until pin 48 reaches an intermediate position within slot 50. This permits initial enggement and slippage between friction disc 18 and drive disc 16 and some rotation of floating plate member 42. As illustrated in FIG. 3, if friction disc 18 is rotated clockwise by drive disc 16, floating member guide pin 58 rotates and moves into engagement against the corner formed by the vertical and horizontal edges 62 and 64 of the left-hand guide bracket while floating member guide pin 60 engages the vertical edge 62 of the right-hand guide bracket 66. Alternatively, as shown in FIG. 5, if friction disc 18 is rotated counterclockwise by drive disc 16, floating member guide pin 60 rotates and moves into engagement with the corner formed by the vertical and horizontal edges 62 and 64 of the right-hand guide bracket 66 while floating member guide pin 58 engages the vertical edge 62 of left-hand guide bracket 66.

Figures 3, 5:
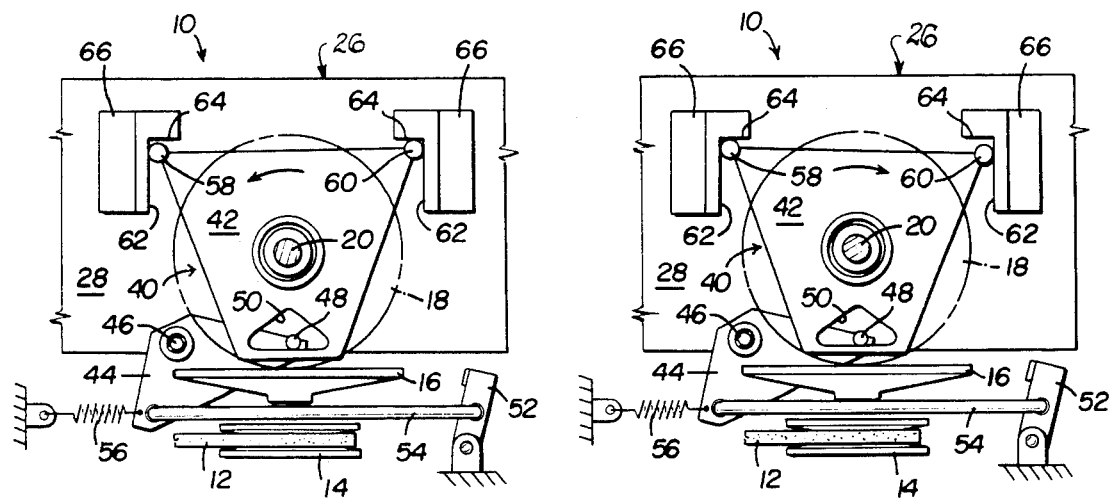
FIG. 3 is a view taken along line 3—3 in FIG. 2 illustrating the friction drive transmission in an engaged condition with the driven disc being rotated clockwise.
FIG. 5 is a view similar to FIG. 3 illustrating the friction drive transmission in an engaged condition with the driven disc being rotated counterclockwise.

During the initial slippage engagement between discs 16 and 18, the vertical force from the guide bracket 66 on guide pin 58 in FIG. 3 or guide pin 60 in FIG. 5 is balanced by the vertical force between discs 16 and 18 which permits horizontal frictional forces between discs 16 and 18 for the self-energizing effect and for a smooth start. Thus, when clutch pedal 52 is partially released which places pin 48 at an intermediate position within slot 50, slippage occurs between discs 16 and 18 as they initially contact thereby providing smooth acceleration from stop to a travel speed.

As illustrated in FIGS. 3 and 5, when clutch pedal 52 is completely released, removing the clutch pedal force on bellcrank 44, spring 56 rotates bellcrank 44 clockwise for biasing pin 48 against the lower edge of slot 50 thereby providing an additional normal force between friction disc 18 and drive disc 16. This additional spring or normal force from friction disc 18 to drive disc 16 overcomes slippage between the discs for accommodating high traction load requirements.

Thus, the self-energizing friction disc transmission of the present invention provides a smooth start by permitting some slippage between discs 16 and 18 when they are initially engaged while adding a spring or normal force between the discs to overcome slippage under load.

It will be apparent to those skilled in the art that the foregoing disclosure is exemplary in nature rather than limiting, the invention being limited only by the appended clams.

I claim:

1. A self-energizing friction disc transmission comprising:

a drive disc rotatably mounted on a generally vertical axis, power means for rotating said drive disc, a driven friction disc rotatable on a drive shaft above said drive disc, and said driven disc having a periphery that is selectively movable into contact with a face on said drive disc;

movable means for lowering said driven disc into contact with said drive disc and for permitting some slippage between said discs when they initially contact and said movable means including a floating member connected to said driven disc drive shaft and clutch means connected to said floating member for raising and lowering said floating member and driven disc relative to said drive disc;

means for applying an additional force between said driven and drive discs after they initially contact to overcome slippage between said discs under load, said means for applying a force including a spring biased actuator member connected between said clutch means and said floating member, said actuator member including a pin means that is movable within a slot in said floating member, said clutch means being depressed for overcoming the spring bias on said actuator member such that said pin means engages one edge of said floating member slot thereby raising said floating member and said driven disc away from said drive disc, said clutch means being partially released until said pin means reaches an intermediate position within said floating plate slot for permitting initial contact and slippage between said discs, and said clutch means being completely released such that said pin means engages on opposite edge of said floating member slot in response to the spring bias on said actuator member thereby providing an additional force between said driven and drive discs after they initially contact; and said floating member including opposed guide pins which are engageable with guide brackets to limit the vertical movement of said floating member wherein said floating member being rotated in opposite directions depending upon the direction of rotation of said driven disc upon initial contact with said drive disc and one of said guide pins moving into engagement with a respective guide bracket for balancing the vertical force component between said discs.

* * * * *